Patented Mar. 13, 1951

2,544,823

UNITED STATES PATENT OFFICE 2,544,823

N-(HYDROXY ARYL) PYRROLINES AND PYRROLIDINES

Joseph A. Chenicek, Bensenville, Ill., assignor to Universal Oil Products Company, Chicago, Ill., a corporation of Delaware No Drawing. Application February 8, 1949, Serial No. 75,306

5 Claims. (Cl. 260—313)

This invention relates to novel compositions of matter.

In one embodiment this invention relates to a novel composition of matter comprising a polycyclic compound consisting of a hydroxy aromatic cyclic ring joined to the nitrogen atom of a 5 membered heterocyclic ring consisting of nitrogen and carbon and containing not more than one double bond.

In a specific embodiment the present invention relates to a novel composition of matter comprising 1-(p-hydroxyphenyl)-pyrroline.

In another specific embodiment the present invention relates to a novel composition of matter comprising 1-(p-hydroxyphenyl)-2,5-dimethyl-pyrrolidine.

As hereinbefore set forth, the novel composition of matter of the present invention comprises a polycyclic compound which may be represented by the following general formula,

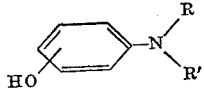

where R and R' are carbon atoms of a 5 membered nitrogen heterocyclic ring containing not more than one double bond, as further illustrated in the following typical examples of compounds of the present invention.

Preferred compounds of the present invention comprise hydroxyphenol-pyrrolidines and particularly 1-(p-hydroxyphenyl)-2,5-dimethylpyrrolidine which is illustrated in the following formula,

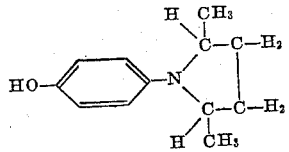

The above compound is readily prepared by condensing acetonyl acetone with p-aminophenol and hydrogenating the resultant product. It is understood that the aromatic ring and/or the heterocyclic ring may contain various further substituents including alkyl, aryl, aralkyl, alkaryl, alkoxy, aralkoxy, hydroxy, etc., radicals, and that these alternative, but not necessarily equivalent, compounds may be prepared by further alkylating the above compound or by the use of other 1,4-diketones or other hydroxy aromatic compounds in the preparation of the compounds of the present invention.

Still another type of compound included within the scope of the present invention is hydroxyphenyl-pyrrolines and particularly 1-(p-hydroxyphenyl)-pyrroline as shown in the following formula,

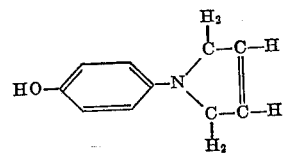

Here again it is understood that either or both of the rings may contain other substituent radicals as hereinbefore set forth.

It will be noted that hydroxyphenyl-pyrrolidine comprises a saturated heterocyclic ring and that the hydroxyphenyl-pyrroline contains one double bond in the heterocyclic ring. As hereinbefore set forth, it is an essential feature of the present invention that the heterocyclic ring contains not more than one double bond and thus the present invention does not include such heterocyclic compounds containing pyrrole rings.

In the preferred compounds of the present invention, the hydroxy radical attached to the aromatic ring is in a position para to the nitrogen atom. However, it is understood that compounds in which the hydroxy group is in the ortho or meta position are comprised within the scope of the present invention.

The novel compounds of the present invention will have utility as antioxidants to prevent oxidative deterioration of organic compounds and is particularly useful in the stabilization of olefinic gasoline such as cracked gasoline and polymer gasoline to prevent deterioration thereof in storage.

I claim as my invention:

1. A novel composition of matter comprising a polycyclic compound containing a hydroxy aromatic ring joined to the nitrogen atom of a 5-numbered heterocyclic ring consisting of nitrogen and carbon and containing not more than one double bond.

2. A novel composition of matter comprising a hydroxyphenyl-pyrrolidine in which the aromatic ring is joined to the nitrogen atom of the heterocyclic ring.

3. 1-(p-hydroxyphenyl) - 2,5 - dimethylpyrrolidine.

4. A novel composition of matter comprising a hydroxyphenyl-pyrroline in which the aromatic ring is joined to the nitrogen atom of the heterocyclic ring.

5. 1-(p-hydroxyphenyl)-2,5-dimethylpyrroline.

JOSEPH A. CHENICEK.

(References on following page)

REFERENCES CITED

The following references are of record in the file of this patent:

UNITED STATES PATENTS

| Number | Name | Date |
|---|---|---|
| 2,326,721 | Bruson | Aug. 10, 1943 |
| 2,350,843 | Vanselow et al. | June 6, 1944 |
| 2,410,783 | Hardman | Nov. 5, 1946 |
| 2,421,650 | Reppe et al. | June 3, 1947 |
| 2,489,000 | Valentine | Nov. 22, 1949 |

OTHER REFERENCES

Chem. Abstracts, vol. 27, pp. 3472–3473 (1933), citing: Craig, J. Am. Chem. Soc. 55:2543–2550.